Dec. 15, 1964 R. J. FALK 3,161,101

PUNCHING APPARATUS

Filed April 16, 1962

Robert J. Falk,
Inventor.
Koenig, Pope, Senniger and Powers,
Attorneys.

3,161,101
PUNCHING APPARATUS

Robert J. Falk, Skokie, Ill., assignor to Southern Illinois University Foundation, Carbondale, Ill., a corporation of Illinois Filed Apr. 16, 1962, Ser. No. 187,777
7 Claims. (Cl. 83—451)

This invention relates to punching apparatus and more particularly to apparatus for punching holes in a predetermined location in a strip of translucent material, such as film, having a fingerprint recorded thereon, the density of which fingerprint is to be subsequently measured in the practice of the so-called palmar sweat method of measuring anxiety.

As noted in co-assigned application Serial No. 211,519, filed July 23, 1962, entitled Measurement of Fingerprint Density Apparatus and Method, behavioral scientists have been concerned with devising an objective measure of anxiety. To this end, it was discovered that sensory stimuli indicative of anticipatory apprehension provoked fingertip sweating without affecting a change in general bodily sweating.

This led to the development of a discrete and objective index for measuring anxiety. Procedurally, this measure is based upon the chemical reaction which obtains when perspiration soluble anhydrous ferric chloride, applied to the palmar side of the fingertips, is brought into contact with a tannic acid bearing agent such as a strip of film containing uniform emulsion saturated with tannic acid. Since the reaction of the anhydrous ferric chloride and tannic acid produces an ink fingerprint which is a dependent function of the extent of fingertip perspiration, the resulting darkness of the print is considered indicative of the degree of anxiety.

As noted in the above co-assigned application, the strip of film having the fingerprint thereon includes a blank portion adjacent but spaced from the fingerprint portion. Thus the strip is the equivalent of two frames in length. The fingerprint may be located on the left-hand portion, for example, in which event the right-hand portion is substantially clear, i.e., the right-hand portion does not have a fingerprint thereon. The strip of film must be accurately positioned in the film holder of the apparatus for measuring density of the fingerprint with the center whorl of the fingerprint being located over one aperture in the film holder and the clear area of the film being located over a second aperture in the film holder. A source of light is located below the apertures and a first photoelectric cell is located above the portion of the film strip while a second photoelectric cell is located above the clear area of the film strip. Inasmuch as the center whorl of the fingerprint is used as a reference point in measuring the density of the print bearing the fingerprint, it is essential that the center whorl be located over the proper aperture regardless of the location of the center whorl in the fingerprint. In this regard, two upstanding pegs are provided on opposite sides of the film holder of the fingerprint measuring apparatus. These pegs are adapted to extend through holes or openings in the film strip to hold the film in the desired position. Thus the holes must be punched in the film strip in a predetermined location relative to a reference point of the fingerprint on the strip (e.g., the center whorl) in order to obtain an accurate reading with the fingerprint measuring apparatus.

Accordingly, among the several objects of this invention may be noted the provision of novel punching apparatus which is adapted to punch one or more holes in a film strip in predetermined locations relative to the location of a reference point of the fingerprint on the strip; the provision of such punching apparatus which may be readily adjusted so as to position a strip of film in the desired location to carry out the punching operation; and the provision of punching apparatus of the class described which is simple and economical in construction. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a plan view of the punching apparatus of this invention;

Corresponding reference characters indicate corresponding parts throughout the several views of the drawings.

Figures 1, 2, 3, 4, 5, 6:
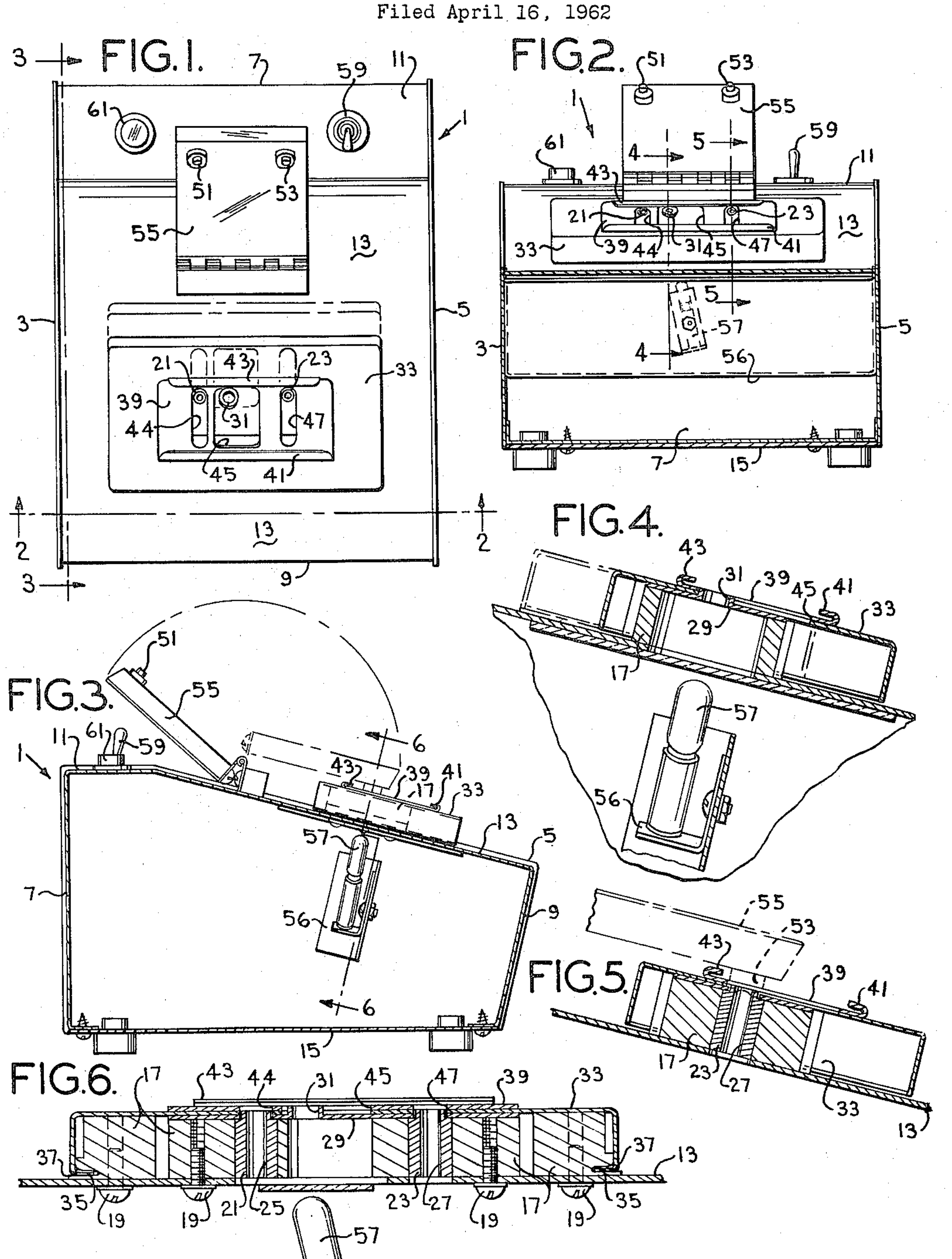
FIG. 2 is a vertical section taken on line 2—2 of FIG. 1.
FIG. 3 is a vertical section taken on line 3—3 of FIG. 1.
FIG. 4 is an enlarged fragmentary vertical section taken on line 4—4 of FIG. 2.
FIG. 5 is an enlarged fragmentary vertical section taken on line 5—5 of FIG. 2, with certain parts removed.
FIG. 6 is an enlarged fragmentary section taken on line 6—6 of FIG. 3, with certain parts removed.

Referring now to the drawings, an exemplary punching apparatus of this invention is shown to include a housing 1 having side walls 3 and 5, a rear wall 7, a front wall 9, a top 11 having an inclined portion 13, and a bottom 15.

A rectangular base 17 is attached to the upper surface of inclined top portion 13 by screws 19 (FIG. 6). Base 17 is provided with two punch dies 21 and 23 having openings or holes 25 and 27, respectively, therein. Also forming a part of base 17 is a plate 29 having an aperture 31 therein. The relative spaced locations of the opening 25, the opening 27 and the aperture 31 are such that they respectively correspond to and are spaced apart the same distances as the left-hand peg, right-hand peg, and the left-hand aperture of the film holder in the fingerprint measuring apparatus referred to above and described in co-assigned application Serial No. 211,519.

A film carrier 33 has flanges 35 located within the grooves 37 in the lateral sides of base 17, whereby the carrier 33 is adapted to slide forwardly and rearwardly on the base 17. A film plate 39 is mounted on the carrier 33 over plate 29 for carrying a strip of film. The forward and rearward edges of the plate 39 are turned toward one another as indicated at 41 and 43 (FIG. 5) to provide a guide track for receiving a strip of film and to permit endwise adjustment of the strip of film mounted thereon. Openings 44, 45 and 47 extend through the carrier 33 and plate 39 and are respectively aligned with punch die 21, aperture 31, and punch die 23. It will thus be seen that the film carrier 33 may be moved forwardly and rearwardly of the bed while a strip of film carried by plate 39 may be moved transversely with respect to the movement of the carrier so that any point on the film strip may be readily positioned over aperture 31. It is to be understood that the term "film" as used herein refers to all types of translucent material such as cellulose acetate film, for example, upon which a fingerprint may be recorded.

Punches 51 and 53 are attached to the outer end of a hinged plate 55. The plate 55 and punches 51 and 53 are adapted for movement from a raised retracted position in which the punches and punch dies are separated (as shown by the solid line indication of the punches and plate 55 in FIG. 3) to a punching position wherein the punch 51 engages punch die 21 and punch 53 engages the punch die 23 (see the broken line indication of the plate 55 in FIGS. 3 and 5).

Mounted in housing 1 by a bracket 56 and located below aperture 31 is a source of illumination or lamp 57. Lamp 57 is adapted to be energized through lines (not shown) connected to a power source (also not shown) by a switch 59 on the top 11 of the housing 1. A second lamp 61 is also adapted to be energized by switch 59 and serves to give an indication to the operator that power is being supplied to the lamp 57.

Figure 7:
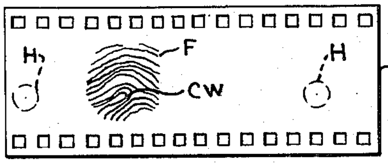
FIG. 7 is an enlarged plan view of a strip of film having a fingerprint thereon.

FIG. 7 shows a strip S of film on which a fingerprint F has been recorded. The center whorl of the fingerprint which constitutes a reference point, is indicated at CW. It will be understood that the location of the center whorl with respect to the balance of the print will vary from print to print whether of the same or different subjects. Thus, the center whorl may be located at various places on the film strip S. Accordingly, the holes to be punched in the strip S must be at such locations that when the above-noted pegs of the apparatus for measuring the density of the fingerprint are received in these holes, the center whorl will be correctly positioned over the left-hand aperture of the apparatus. For example, in the particular film strip S shown in FIG. 7, the holes are punched at the locations indicated by dotted circles H, these holes being so spaced with respect to center whorl CW that the latter will be accurately positioned over the left-hand aperture of the film holder when the holes are received on the pegs extending up from the holder.

Operation of the apparatus to obtain the above relationship between the center whorl and the punched holes is as follows:

The switch 59 is actuated to energize lamp 57. A strip of film S with a fingerprint thereon is then placed on the plate 39 under the turned-in edges 41 and 43. The strip S may be manually moved to the left or right of the carrier 33 as viewed in FIG. 1 and the carrier may be moved rearwardly until the center whorl CW of the fingerprint on the strip is accurately positioned over aperture 31. The provision of the lamp 57 facilitates the positioning of the center whorl centrally over this aperture. When the center whorl is located over aperture 31, the hinge plate 55 and punches 51, 53 are swung from their retracted position to their punching position to punch two holes H in the film strip. These holes are thus located at the desired locations relative to the center whorl of the fingerprint. The film strip is then in condition to be inserted in the apparatus for measuring the density of the fingerprint as described in the above-mentioned copending application with the openings which are to be received on the pegs so located that the center whorl of the print is then accurately positioned over the correct aperture.

While the apparatus of the invention has been described as including two punches and two dies, it will be understood that only one punch and die would be provided if the apparatus for measuring the fingerprint density utilized only one positioning peg.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for punching an opening in a strip of translucent material in a predetermined location relative to a reference point of a fingerprint on said strip comprising a base, a die member, a punch member cooperable with the die member, one of said members being fixed on the base and the other of said members being movably mounted on the base, a strip carrier mounted on the base for adjustment to different positions and adapted to have the strip mounted thereon in different adjusted positions relative to the carrier, said carrier having an opening therein through which said die member is accessible to said punch member in any adjusted position of said carrier, and means associated with the base for indicating adjustment of the strip relative to the carrier and adjustment of the carrier relative to the base to a position wherein engagement of the punch and die members will effect punching of the opening in the strip in said predetermined location relative to said reference point.

2. Apparatus for punching an opening in a strip of translucent material in a predetermined location relative to a reference point of a fingerprint on said strip comprising a base, a die fixed on said base, a punch movably mounted on the base cooperable with the die, a strip carrier mounted on the base for adjustment to different positions and adapted to have the strip mounted thereon in different adjusted positions relative to the carrier, said carrer having an opening therein through which said die is accessible to said punch in any adjusted position of said carrier, and means associated with the base for indicating adjustment of the strip relative to the carrier and adjustment of the carrier relative to the base to a position wherein operation of the punch will effect punching of the opening in the strip in said predetermined location relative to said reference point.

3. Apparatus for punching an opening in a strip of translucent material in a predetermined location relative to a reference point of a fingerprint on said strip comprising a base, a die fixed on said base, a punch movably mounted on the base cooperable with the die, a strip carrier having means for retaining the strip permitting adjustment of the strip endwise, said carrier being mounted on the base for movement in the direction transverse to the length of the strip for adjustment of the strip transversely of its length, said carrier having an opening therein through which said die is accessible to said punch in any adjusted position of said carrier, and means associated with the base for indicating adjustment of the strip relative to the carrier and adjustment of the carrier relative to the base to a position wherein operation of the punch will effect punching of the opening in the strip in said predetermined location relative to said reference point.

4. Apparatus as set forth in claim 3 wherein said means associated with the base includes an aperture in said base and a source of illumination below said aperture, said carrier having a second opening therein whereby said reference point of said fingerprint may be accurately positioned and viewed over said aperture in any adjusted position of said carrier.

5. Apparatus as set forth in claim 4 wherein said means for retaining the strip comprise guides for the edges of the strip.

6. Apparatus for punching a pair of openings in a strip of translucent material in predetermined locations relative to the center whorl of a fingerprint on said strip comprising a base, a pair of dies fixed on said base, a pair of punches pivotally mounted on the base cooperable with the dies, a carrier for said strip having means for retaining the edges of the strip permitting adjustment of the strip endwise, said carrier being slidably mounted on the base for movement in the direction transverse to the length of the strip for adjustment of the strip transversely of its length, said carrier having first and second openings therein through which said dies are accessible to said punches in any adjusted position of said carrier, and means associated with the base for indicating adjustment of the strip relative to the carrier and adjustment of the carrier relative to the base to a position wherein operation of the punches will effect punching of a pair of openings in the strip in said predetermined locations relative to said center whorl.

7. Apparatus as set forth in claim 6 wherein said means associated with the base includes an aperture in said base and a lamp below said aperture, said carrier having a third opening therein whereby said center whorl of said fingerprint may be accurately positioned and viewed over said aperture in any adjusted position of said carrier.

References Cited in the file of this patent

UNITED STATES PATENTS

| | | |
|---|---|---|
| 1,396,895 | Stolz | Nov. 15, 1921 |
| 1,696,442 | Messmer | Dec. 25, 1928 |
| 2,783,842 | Mainardi | Mar. 5, 1957 |

FOREIGN PATENTS

| | | |
|---|---|---|
| 381,360 | Great Britain | Oct. 6, 1932 |